(No Model.) 2 Sheets—Sheet 1.

G. F. EVANS.
FRICTIONAL GEARING

No. 401,018. Patented Apr. 9, 1889.

Witnesses.
Francis C. Stanwood
E. K. Boynton

Inventor:
G. Frank Evans.
by H. E. Lodge, Atty.

(No Model.) 2 Sheets—Sheet 2.
G. F. EVANS.
FRICTIONAL GEARING.

No. 401,018. Patented Apr. 9, 1889.

Witnesses.
Francis C. Stanwood
Geo. B. Elliot

Inventor.
G. Frank Evans.
by H. E. Lodge, Atty.

UNITED STATES PATENT OFFICE.

GEORGE FRANK EVANS, OF SOMERVILLE, MASSACHUSETTS.

FRICTIONAL GEARING.

SPECIFICATION forming part of Letters Patent No. 401,018, dated April 9, 1889.

Application filed July 26, 1888. Serial No. 281,084. (No model.)

*To all whom it may concern:*

Be it known that I, GEORGE FRANK EVANS, a citizen of the United States, residing at Somerville, in the county of Middlesex and State of Massachusetts, have invented certain new and useful Improvements in Frictional Gearing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to frictional gearing; and it consists, primarily, in the employment of an endless belt, which loosely encircles one of two operating-gears, the peripheries of the latter not being in contact, but sufficiently near together to grip the endless band which passes between them.

Furthermore, this invention relates to a patent of mine, No. 390,216, in which is described mechanism for operating two parallel shafts by means of straight-faced frictional gears and a loose endless band.

The object of my present invention is to provide mechanism with which to operate by means of "frictional gearing," so called, two shafts which are not parallel. This gearing consists of two bevel friction-gears not in contact, which grip an endless belt loosely encircling one of said gears and adapted to pass between the two gears.

Figure 2:
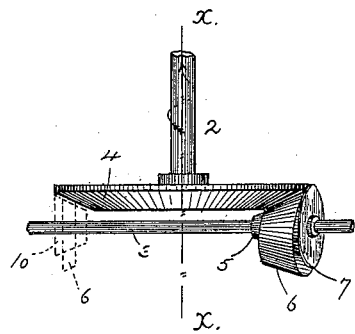
Figure 1:
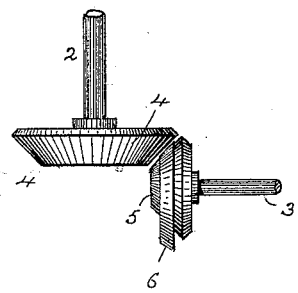
Figure 5:
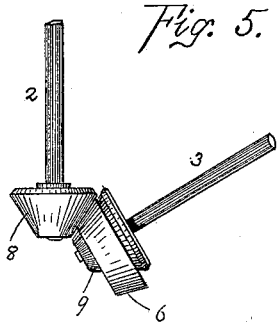
Figure 3:
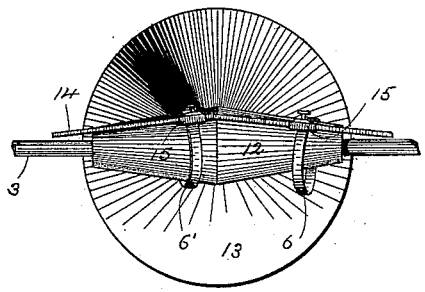
Figure 6:
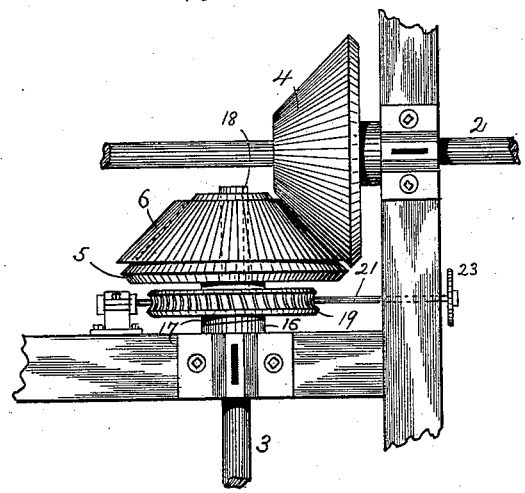
Figure 7:
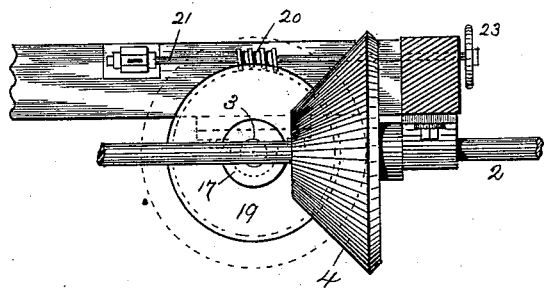

The drawings herewith annexed represent, in Figure 1, frictional gearing which embodies my invention, showing two co-operating shafts at right angles. Fig. 2 is a modification in which a flange is formed upon one of the bevel friction-gears. Fig. 3 is a plan, and Fig. 4 a vertical section diametrically, of two gears, showing mechanism by which the motion of the driven shaft can be reversed. Fig. 5 is a plan of two shafts obliquely positioned. Fig. 6 represents in elevation mechanism for causing the driven gear to approach or retreat from the continuously-rotary driving-gear. Fig. 7 is a plan of the same with the driven gear represented only in broken lines to more clearly show said mechanism.

The principle of frictional gearing in connection with a continuous band which loosely encircles one of the frictional gears has been fully explained in my patent before referred to; hence it will be unnecessary to repeat such explanation in the present application.

The gist of my invention is embodied in the arrangement of parts by which I am enabled to operate two shafts not parallel, but at right angles or inclined at any angle desired. The advantages thus obtained are apparent.

In the drawings (see Fig. 1) I have shown two shafts—the driver at 2, the driven or actuated one at 3. Upon their adjacent ends are affixed two frictional gears, 4 5, respectively. In the present instance said gears are miter-gears and the shafts at right angles. About the gear 5 on the driven shaft is placed an endless band or belt, 6, which loosely encircles the latter and passes between the two gears by which it is gripped. To start and stop the driven shafts, as occasion requires, the latter is adapted to have endwise movement, which may be produced by any suitable mechanism, and thus the frictional gear 5 may be caused to approach or retreat from the co-operating gear 4, and thus by producing pressure upon the band or removing it entirely therefrom cause the shaft 3 to start or stop.

In Figs. 6 and 7 I have shown mechanism for operating the driven gear 5 in order to cause it to approach the driving-gear 4, and thereby produce sufficient pressure between the gears to grip the belt and cause activity in said gear 5, or, by causing said gear 5 to retreat from its co-operating gear, reduce the pressure and permit the driven gear to become stationary, as occasion may require. There are many mechanical expedients which will suggest themselves to those skilled in the art; but the parts shown in said Figs. 6 and 7 will suffice to illustrate one way in which this result can be accomplished. In said drawings the driving-shaft 2 and its gear 4 are presumed to have continuous rotary movement. To cause the shaft 3, with its gear 5, to start or become active, said shaft is provided with a cam-faced hub, 16, which contacts with a similar but oppositely-arranged hub, 17, forming part of the gear 5. This latter is free to move endwise of its shaft upon a spline, 18, by which connection the shaft and gear are compelled to rotate in unison. Further, affixed to the hub of the gear is a spirally-toothed wheel, 19, adapted to engage a worm, 20, which is mounted upon a shaft, 21, suitably journaled and controlled by a hand-wheel, 23. By movement of the shaft 21 and its worm the wheel 19 is given a partial revolution, and by means of its cam-faced hub 17, bearing against the fixed hub 16 on the shaft, the gear 5 is forcibly pressed toward the driving-gear or caused to withdraw therefrom, moving endwise of its shaft. Hence the counter or driven shaft may be rendered active or inactive and the pressure upon the belt adjusted during its rotation.

In the above instance the bevel-gear is shown as having endwise movement upon the shaft; but in lieu thereof it is evident that said gear may be fast upon the shaft and mechanism applied to the shaft to actuate the latter, and thereby produce proper pressure upon the belt or remove it therefrom.

In Fig. 2 is shown a modification of the above mechanism, in which the actuated gear 5 is provided with a flange or rim, 7, and in instances where heavy work is to be done prevents accidental crowding of the belt to the high side of the frictional gears.

Fig. 5 illustrates the advantages of my invention to shafts which are obliquely disposed. As before explained, 2 is the actuating and 3 the actuated shaft, furnished with bevel frictional gears 8 9. Between the latter operates the endless band 6, which loosely encircles the gear 9.

It is evident that by simply changing the bevels of the two gears, at the same time maintaining their adjacent surfaces parallel, the shafts can be set at any desired angle.

It will be readily understood with frictional gearing of the above description that the driven shaft may have forward advance motion or may be reversed, as is desired, by extending the driven shaft (see Fig. 2) and mounting thereon a second frictional gear, 10, as shown by the broken lines. Thus, if the shaft 2 has rotation, as indicated, all portions of the gear 4 to the right of the line $x$ $x$ have rotation toward the observer, while all parts to the left have motion from the observer. If it is desired to actuate the shaft 3 toward the observer, the gear 5 is to be used. When reverse rotation is to be effected, the gear 10 is employed.

Figure 4:
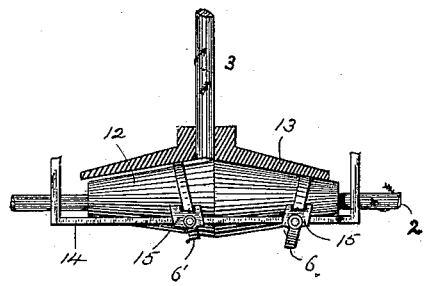

To simplify this mechanism and combine it in a more compact form, I have shown in Figs. 3 and 4 a double cone-gear, 12, having its largest diameter midway of its length and mounted upon the driving-shaft 2. This gear, it is evident, is a substantial equivalent of the two gears 5 10 in Fig. 2. Co-operating with said gear and secured upon the end of the driven shaft 3 is a recessed bevel-gear, 13—that is, upon any diametrical vertical section the opposite sides or active surfaces form a re-entering angle. (See Fig. 4.) The bevel of the gear 13 is such that the opposite sides are coincident with but do not touch the double cone-gear 12. The latter has endwise movement with the shaft 2, and by means of two belts, 6 6', the shaft 3 may be rotated in either direction. With the shaft 2 rotating as indicated, and with the belt 6 active, the shaft 3 is moving as indicated. The belts 6 6' are supported upon a rod, 14, and adjustable lengthwise thereon by guide-eyes 15 15, in order that the points of contact of said belts with the frictional gears 12 13 may be varied. The speed of the driven shaft can thus be changed and altered, while its rotation can be reversed, as circumstances may require.

In all instances where this frictional gearing is applied and when the main shaft is kept continuously running the driven shaft is started and stopped by causing the gear thereon to approach or retreat from the gear on the main line.

What I desire to claim is—

1. The device for transmitting motion between two lines of shafting not parallel, substantially as described, composed of two shafts, two beveled frictional gears mounted on their adjacent ends, and a loose endless band encircling one of said gears and adapted to pass between and be gripped by said gears, as specified.

2. In frictional gearing by which motion is transmitted between two shafts not in parallelism, the combination, with two beveled frictional gears and their supporting-shafts, of a loose endless band encircling one gear and adapted to be gripped by both, and means for adjusting one of said gears to control the pressure upon the band, substantially as and for the purposes herein set forth.

3. In frictional gearing of the class described, the combination, with two beveled gears, one of which is flanged, and the shafts upon which they are mounted, of the loose endless band encircling one of said gears and gripped by the adjacent surfaces of the latter, and adjusting mechanism by which the gears are caused to approach or separate, substantially as described.

4. In a device for transmitting motion between shafts not in parallelism, the shaft 2, its frictional beveled gear 4, the shaft 3, having endwise motion, and the frictional gears 5 10, oppositely disposed thereon and positioned diametrically of said gear 4, combined with two endless bands which loosely encircle said gears 5 10 and co-operate with the gear 4, substantially as set forth and stated.

5. In frictional gearing of the class described, the mechanism for transmitting motion and for reversing the motion transmitted, as described, composed of a shaft which carries a frictional gear provided with a re-entering active surface, a shaft having endwise movement carrying a gear formed with two reversely-conical surfaces, and two adjustable endless bands which operate independently upon said conical surfaces and are gripped between the latter and the re-entering surface of the co-operating gear, substantially as herein set forth.

6. In mechanism for transmitting motion from one shaft to another not parallel with the first, a shaft provided with a beveled frictional gear, and a second shaft furnished with conical gears oppositely disposed thereon, combined with two endless bands loosely encircling said conical gears and gripped between said gears and the beveled gear upon diametrically-opposite portions of the latter to render the driven shaft revoluble in either direction, as herein specified.

In testimony whereof I affix my signature in presence of two witnesses.

G. FRANK EVANS.

Witnesses:
  H. E. LODGE,
  FRANCIS C. STANWOOD.